(12) United States Patent
Eberle et al.

(10) Patent No.: US 9,868,509 B2
(45) Date of Patent: Jan. 16, 2018

(54) COMBINATION COMPRISING AN AIRCRAFT WING TRAILING EDGE SECTION AND AN ADJUSTMENT BODY

(71) Applicants: Airbus Operations GmbH, Hamburg (DE); AIRBUS SAS, Blagnac (FR)

(72) Inventors: Adrian Eberle, Hamburg (DE); Tobias Nüssle, Hamburg (DE); Jean Bardou, Hamburg (DE)

(73) Assignees: Airbus Operations GmbH (DE); AIRBUS SAS (FR)

(*) Notice: Subject to any disclaimer, the term of this patent is extended or adjusted under 35 U.S.C. 154(b) by 832 days.

(21) Appl. No.: 14/323,304

(22) Filed: Jul. 3, 2014

(65) Prior Publication Data
US 2014/0312176 A1    Oct. 23, 2014

Related U.S. Application Data

(63) Continuation of application No. PCT/EP2013/050096, filed on Jan. 4, 2013.

(Continued)

(30) Foreign Application Priority Data

Jan. 6, 2012  (EP) .................................. 12290007

(51) Int. Cl.
 B64C 3/50  (2006.01)
 B64C 3/28  (2006.01)
 B64C 3/14  (2006.01)

(52) U.S. Cl.
 CPC ............... B64C 3/28 (2013.01); B64C 3/14 (2013.01); B64C 3/50 (2013.01);
(Continued)

(58) Field of Classification Search
 CPC ............... B64C 2003/148; B64C 3/14; B64C 2003/147; B64C 21/00; B64C 21/10;
(Continued)

(56) References Cited

U.S. PATENT DOCUMENTS 3,578,264 A * 5/1971 Kuethe .................. B64C 21/10
                                                         181/220
4,542,868 A    9/1985 Boyd
(Continued)

FOREIGN PATENT DOCUMENTS

| CN | 101497371 A | 8/2009 |
|---|---|---|
| CN | 101842584 A | 9/2010 |
| GB | 2059373 A | 4/1981 |

OTHER PUBLICATIONS

European Search Report EP 12 29 0007 (dated Jun. 14, 2012).
(Continued)

*Primary Examiner* — Philip J Bonzell
(74) *Attorney, Agent, or Firm* — Lerner, David, Littenberg, Krumholz & Mentlik, LLP

(57) ABSTRACT

A combination comprises an aircraft wing trailing edge section and an adjustment body. The adjustment body comprises a tapered cross section in a local chord axis direction of the wing trailing edge section, a lower adjustment body surface connected to a top surface of the aircraft wing trailing edge section and a back-end surface having a height. The adjustment body is positioned such that the back-end surface is flush with the trailing edge of the aircraft wing trailing edge section. Attaching the adjustment body onto a top surface of the wing trailing edge section leads to compensation of an offset rolling moment due to unavoidable structural shape deviations of the aircraft and eliminates additional structural reinforcement requirements on the trailing edge compared to edge wedges mounted on the bottom surface of trailing edges. The trailing edge section may comprise a flap.

15 Claims, 4 Drawing Sheets

Related U.S. Application Data

(60) Provisional application No. 61/583,812, filed on Jan. 6, 2012.

(52) U.S. Cl.
CPC .. *B64C 2003/147* (2013.01); *B64C 2003/148* (2013.01); *Y02T 50/12* (2013.01)

(58) Field of Classification Search
CPC ......... B64C 23/00; B64C 23/06; B64C 23/04; B64C 23/005; B64C 2230/26; B64C 2230/00
See application file for complete search history.

(56) References Cited

U.S. PATENT DOCUMENTS

| | | | | |
|---|---|---|---|---|
| 5,058,837 A | * | 10/1991 | Wheeler | B64C 23/06 244/198 |
| 5,575,442 A | * | 11/1996 | Tai | B63H 1/18 244/198 |
| 6,382,561 B1 | * | 5/2002 | Brink | B64C 3/14 244/215 |
| 7,100,969 B2 | * | 9/2006 | Choi | B60J 1/20 180/903 |
| 7,927,078 B2 | * | 4/2011 | Parsania | F03D 1/0675 416/228 |
| 8,469,313 B2 | * | 6/2013 | Dong | B64C 23/06 244/123.1 |
| 8,550,777 B2 | | 10/2013 | Kildegaard | |
| 2009/0189023 A1 | | 7/2009 | Mikulla | |
| 2010/0028151 A1 | | 2/2010 | Loftus et al. | |

OTHER PUBLICATIONS

International Search Report (PCT/EP2013/050096) (dated Apr. 2, 2013).

Chinese Office Action dated Apr. 21, 2015.

* cited by examiner

COMBINATION COMPRISING AN AIRCRAFT WING TRAILING EDGE SECTION AND AN ADJUSTMENT BODY

CROSS-REFERENCE TO RELATED APPLICATIONS

This application is a continuation of International Patent Application No. PCT/EP2013/050096, which claims the priority of European Patent Application No. 12 290 007.9, filed Jan. 6, 2012, and of U.S. Provisional Patent Application No. 61/583,812, filed Jan. 6, 2012, the disclosures of which applications are hereby incorporated herein by reference.

TECHNICAL FIELD

The invention relates to a combination of an aircraft wing trailing edge section and an adjustment body. The invention further relates to an aircraft having two wings, each wing having a leading edge, a trailing edge, a chord axis between said leading edge and said trailing edge or a top surface and a bottom wing surface and an adjustment body attached to one wing only.

BACKGROUND OF THE INVENTION

Lateral imbalance of an aircraft, originated by minor, unavoidable and tolerable structural shape deviations occurring in the production process, e.g. asymmetric wing twist, is a well known phenomenon in aircraft design. Such a lateral imbalance may lead to a constant offset rolling moment that needs to be compensated during flight permanently. There are several means known such as a constant deflection of ailerons, flap rigging and attaching wedges to a bottom flap surface at a trailing edge.

U.S. Pat. No. 4,542,868 discloses a wedge-shaped structural component for attachment to the bottom surface of an aircraft wing profile near or along the trailing edge of the aircraft wing. Said wedge-shaped structural component is intended to improve the lift coefficient and to reduce the drag during cruising speeds.

U.S. Pat. No. 6,382,561 B1 discloses a trailing edge wedge for an aircraft wing for attachment to the bottom surface of only one of two wings of an aircraft directly next to and along the trailing edge of the wing and preferably parallel thereto. This trailing edge wedge is designed in a way to compensate any asymmetric aircraft characteristics that are due to the sum of all unavoidable structural tolerances by locally increasing the lift coefficient of the respective wing.

A rather simple way to compensate asymmetric aircraft characteristics is to slightly deflect an aileron on one wing permanently in order to generate a compensating rolling moment. The deflection leads to a distinct drag penalty and therefore is to be avoided.

BRIEF SUMMARY OF THE INVENTION

Wedges attached to a bottom surface of a wing, i.e. at the trailing edge of a flap, may produce less drag than deflected ailerons but may require a structural reinforcement of the flap structure due to the distinct local increase of lift. Potentially, also the flap support structure and the wing box may require reinforcement. This leads to an increase in cost, weight and lead time.

Therefore, it may be an object of the present invention to provide for a compensation of unavoidable structural tolerances and related asymmetric characteristics of an aircraft without requiring aileron deflections or wedges attached to the bottom surface of a flap or other components of a trailing edge section of an aircraft wing. A further object may be the minimization of an increase in aerodynamic drag of the aircraft.

According to the invention, a combination of an aircraft wing trailing edge section and an adjustment body, the adjustment body comprising a tapered cross-section in a local chord axis direction of the wing trailing edge section with an upper adjustment body surface, a lower adjustment body surface and a back-end surface, wherein the lower adjustment body surface is connected to a top surface of the aircraft wing trailing edge section and wherein the back-end surface has a height h, wherein the adjustment body has a length l in a local chord axis direction and wherein the adjustment body is positioned on the wing trailing edge section such that the back-end surface is flush with the trailing edge.

Instead of wedges attached to a lower side of an aircraft wing trailing edge section an adjustment body is attached to the upper side of an opposite wing in order to counteract any lateral imbalance and offset rolling moment of the aircraft, respectively. This results in an effective de-cambering of the profile, resulting in a local lift-loss, e.g. of the flap that includes the wing trailing edge and consequently in generating a compensation rolling moment. In order to fully compensate the effect of the structural shape deviations and the offset rolling moment, respectively, the compensation rolling moment equals the offset rolling moment that results from the structural shape deviations.

As the lift is reduced locally, no additional loads are acting on the flap structure in flight. The complexity of the wing trailing edge section is low and due to unnecessary reinforcements of the flap support structure the solution according to the invention furthermore is very cost-effective and leads to a low additional weight.

It has been found that the de-cambering effect mainly results from the height h of the back-end surface of the adjustment body. Due to a thicker boundary layer on the upper side of the wing compared to the lower side of the wing the height h of the adjustment body needs to be slightly larger than the height of comparable wedges attached to the lower side of the aircraft trailing edge section. In order to achieve a smooth flow transition, sharp edges, recesses or any abrupt changes in the profile shall be avoided.

The adjustment body is designed for attachment to the top surface of the trailing edge section directly next to the trailing edge and preferably parallel thereto. In modern commercial aircraft mainly flap trailing edges constitute the trailing edge of the wing. Therefore, the adjustment body is preferably attached to the top surface of one or more flaps. In order to take the use of a plurality of flaps into consideration the adjustment body may be interrupted in case the necessary lateral extension exceeds the lateral extension of a single flap.

The back-end surface is preferably a flat rectangular surface that preferably spans up perpendicular to the flight direction, such that the normal of the back-end surface is parallel to the flight direction. As an alternative, the normal of the back-end surface may extend parallel to the x-axis of the aircraft. Further, the back-end surface may extend in the same plane or within 0.5% of the local wing chord.

As the total lift coefficient $c_L$ of the aircraft is decreased due to the local de-cambering of one of the wings this lift loss may require compensation. A simple way to accomplish this may be a very slight increase of the angle of attack or the incidence, respectively, leading to a very slight increase of structural load, which load is introduced into the whole wing structure, thereby not requiring any structural reinforcement of a single trailing edge, a flap structure or such.

Attaching the adjustment body to the top surface of the trailing edge section may be accomplished by at least one of gluing, soldering, welding, riveting, screwing, or conducting a clip-connection. A preferable attaching process may be gluing as it does not have a substantial structural or thermal effect on the material of the trailing edge section.

It shall furthermore be assured that the lower adjustment body surface of the adjustment body is attached to the top surface of the trailing edge section in a flush manner such that there are no gaps, slits, recesses or other openings that allow air flow to enter the opening and to rip the adjustment body off the top surface. Preferably, glue used for attaching the adjustment body also acts as a sealing agent and seals an intermediate space between a leading edge of the adjustment body and the top surface of the trailing edge section in an elastic manner. In case the glue tends to brittle during thermal expansion of the intermediate space, an additional or alternative sealing agent may be used.

It is further preferred to produce the adjustment body of a plastic material due to a low possible weight. For example, the adjustment body may be produced of a fiber reinforced composite material such as CFRP, GFRP and KFRP. As alternative, metal materials such as a suitable aluminum or titanium alloy, may also be used. In case the adjustment body has a distinct height it may be produced of a honeycomb structure in order to save weight. In general it may be feasible to use the same material as the top surface where the adjustment body is to be attached to.

When referring to the local chord axis it is to be pointed out that a plurality of local chord axes exist in a spanwise direction wherein the length of the local chord changes with its spanwise position.

In a further advantageous embodiment, the adjustment body has a wedge-shape. Therefore, the transition region between a leading edge of the adjustment body and the back-end surface can be shaped along the length l so as to allow a smooth flow transition.

The upper adjustment body surface may be planar, concave or convex in order to further improve the smooth flow transition.

In a further advantageous embodiment the lower adjustment body surface and the upper adjustment body surface enclose a first angle α within the range of about 5° to about 25° and wherein said first angle α is determined by the ratio of the height h of the back-end surface to the length l in a local chord axis direction to satisfy said first angle range α. Furthermore, the length may correspond to about 1-2% of a local chord length of said aircraft wing and said height h of said back-end surface may correspond to a value between about 0.1% and about 0.6% of said local chord length for compensating asymmetric characteristics caused by a sum of structural tolerances of an aircraft. A wedge shape with a triangular profile is thereby one of the least complex shapes, resulting in a simple production process and therefore low production costs. Furthermore, the wedge shape allows for a rather smooth transition of flow impinging on a leading edge of the upper adjustment body surface.

As an alternative, the lower adjustment body surface and the upper adjustment body surface enclose a first angle α at a leading edge of the adjustment body and wherein a parallel line to the lower adjustment body surface and the upper adjustment body surface enclose a second angle β, wherein the second angle β is higher than the first angle α, thus enabling a smoother transition of the air flow passing the upper adjustment body surface of the adjustment body, compared to a constant slope of the adjustment body.

In a preferred embodiment the adjustment body is provided as a strip-like object with an extension that reaches or exceeds a maximum spanwise extension on the respective wing where it shall be attached. For example, in case the material of the adjustment body has a high elasticity, it may be provided as a virtually endless self-adhesive strip on a roller. In case the material of the adjustment body has a rather poor elasticity, it may be produced in certain lengths that correspond with relevant lateral flap segment extensions or the lateral extension of the relevant trailing edge section itself. Further preferred the adjustment body may be provided with two or more different heights such that for the purpose of individually compensating structural shape deviations of different aircraft different heights of the adjustment body may be chosen according to the desired or necessary compensation rolling moment. Thus, the present adjustment body provides a flexible means for an advantageous compensation not only of asymmetrical characteristics of the aircraft itself that are due to unavoidable structural tolerances but also compensates for asymmetric flight characteristics that may occur unintentionally particularly during cruising flight of an aircraft.

The invention further relates to an aircraft having two wings, each wing including a leading edge, a wing trailing edge, a chord axis between said leading edge and said trailing edge, a top wing surface and a bottom wing surface. An adjustment body having a tapered cross section in a local chord axis direction of the wing trailing edge, a lower adjustment body surface is connected to the top surface of only one of the two aircraft wings. The back-end surface is thereby flush with the wing leading edge. Basically, all of the above mentioned features also apply to the aircraft.

DETAILED DESCRIPTION

Figure 1:
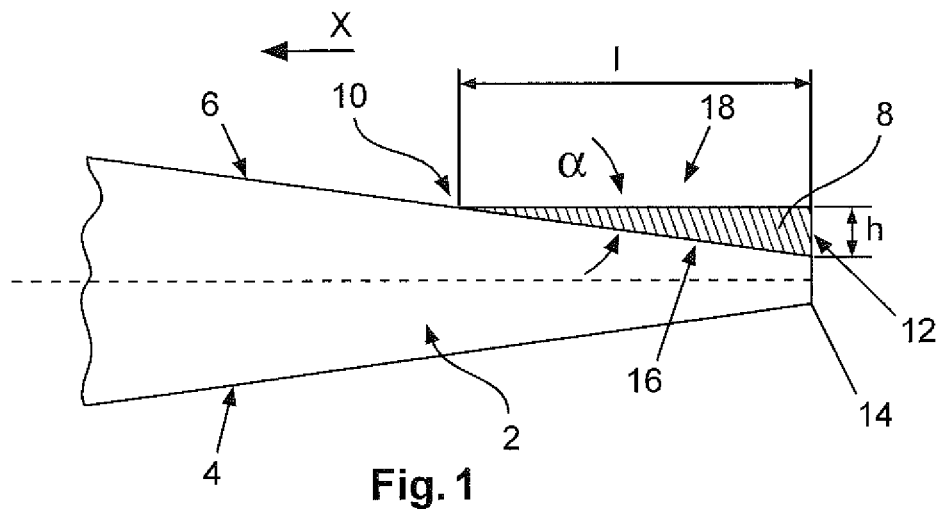
FIG. 1 shows an exemplary embodiment of an adjustment body on a top surface of a wing.

FIG. 1 shows an aircraft wing trailing edge section 2 with a lower surface 4, a top surface 6 and an example for a local chord axis 1. When referring to the local chord axis 1, not necessarily the exact position of the local chord axis 1 indicated in FIG. 1 is to be used. On the top surface 6 of one of two wings of an aircraft, an adjustment body 8 is attached. A direction of flight is indicated by an arrow "x". A leading edge 10 of the adjustment body is directed into the flight direction x (upstream) and a back-end surface 12 is flush with a trailing edge 14 of the trailing edge section 2.

The back-end surface 12 has a height h which is primarily responsible for a de-cambering effect of the aircraft wing in the trailing edge section 2. As the lift coefficient of a wing also depends on the wing camber, it is decreased locally when the adjustment body 8 is present. Due to the local reduction of the lift coefficient on one of two wings, a compensation rolling moment is generated as the other wing has an unchanged lift coefficient. In designing the adjustment body 8 by choosing a height h and an adequate lateral extension along the wingspan in spanwise direction a compensation of an offset rolling moment generated by the sum of structural tolerances of the aircraft is achieved.

The adjustment body 8 may be realized as a wedge-shaped component having a triangular profile with a first angle α that is enclosed between a lower adjustment body surface 16 that is designed to be attached to the top surface 6 of the trailing edge section 2 and an upper adjustment body surface 18 of the adjustment body 8. The first angle α is determined by the ratio of the height h and a length l of the lower adjustment body surface 16 of the adjustment body 8 in the direction of the local chord axis 1. In order to produce a smooth transition of flow, the first angle α should be in the range of about 5° to about 25°, preferably less than 17°.

Figure 2:
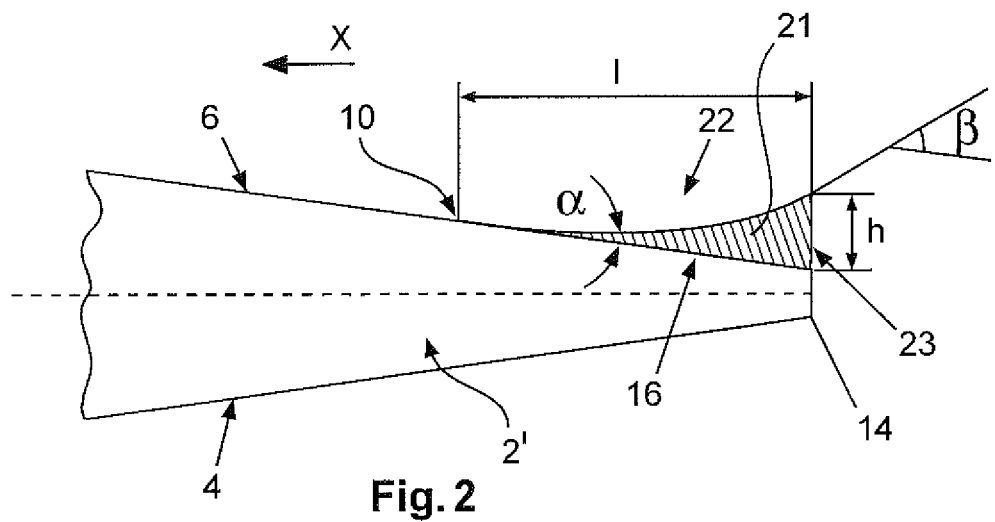
FIG. 2 shows a further exemplary embodiment of an adjustment body.
Figure 7:
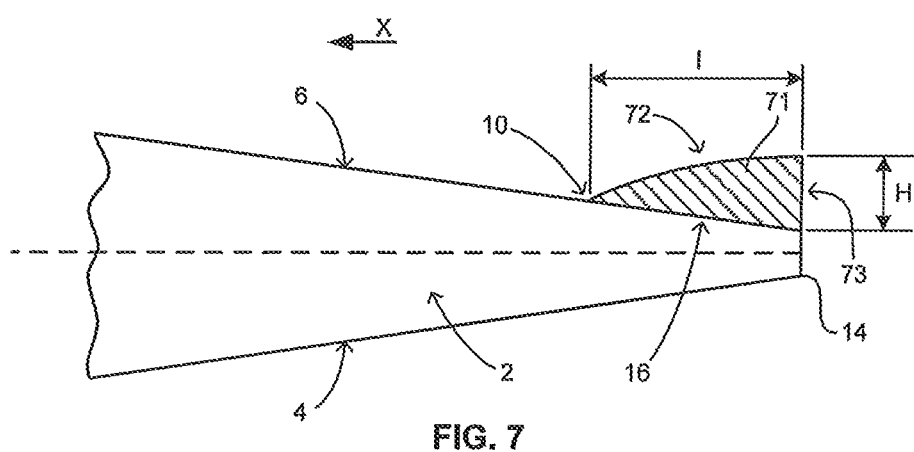
FIG. 7 shows a further exemplary embodiment of an adjustment body.

In additional embodiments, the adjustment body may comprise a shape with an increasing slope in downstream direction, such that a second angle β enclosed between an upper adjustment body surface 22 and a plane parallel to the lower adjustment body surface 16 directly at the intersection with the back end 12 of the adjustment body 8 is higher than the first angle α at the leading edge 10 of the adjustment body. FIG. 2 exemplarily shows an adjustment body 8 with a lower adjustment body surface 16 that corresponds to the lower adjustment body surface 16 of the exemplary embodiment shown in FIG. 1. The upper adjustment body surface 22 has an increasing slope in a downstream direction. Thereby a smoother flow transition may be realized and the vorticity of the air flowing off above the back end surface 12 may be decreased. FIG. 7, on the other hand, shows an adjustment body 71 with a convex upper adjustment body surface 72.

Figure 3:
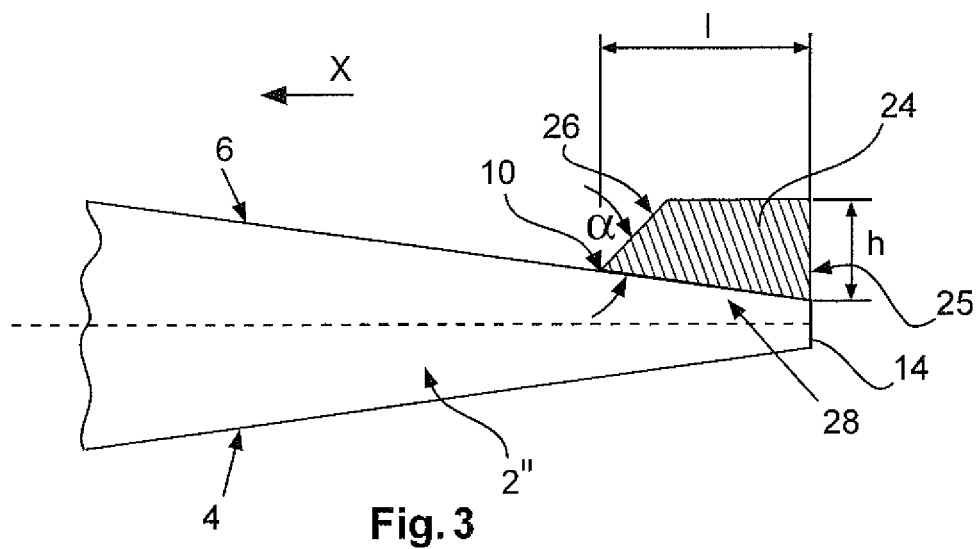
FIG. 3 shows a further exemplary embodiment of an adjustment body.

FIG. 3 shows an adjustment body 24 with a rather steep first angle α between an upper adjustment body surface 26 and a lower adjustment body surface 28 that may be feasible only for aircraft with a cruising speed clearly below a transonic speed as such a steep angle, e.g. 40° or more, may induce vortex generation.

Figure 4:
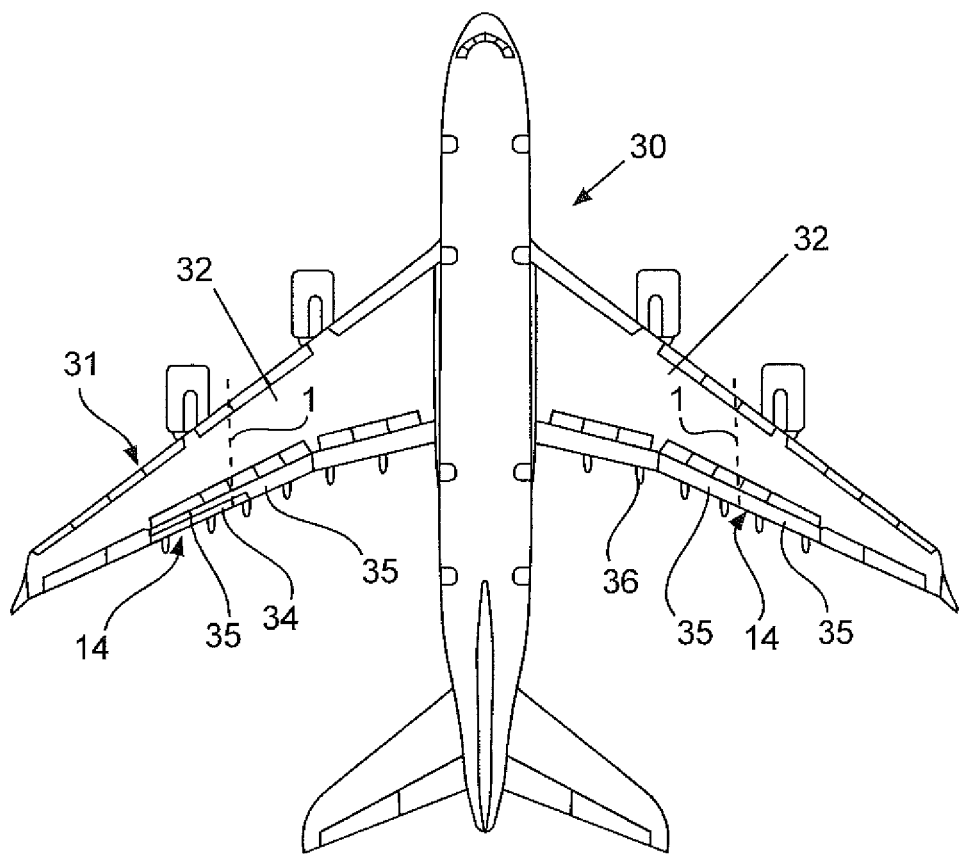
FIG. 4 shows a part of an aircraft with two wings and an adjustment body attached to one of the two wings.

FIG. 4 shows a general arrangement of an adjustment body 34 on one of two wings 32 of an aircraft 30 directly at the trailing edge that is primarily constituted of a plurality of flaps 35. As the adjustment body 34 is used for a compensation of an offset rolling moment due to unavoidable, tolerable structural shape deviations of the aircraft 30, it is attached to only one wing 32 of the aircraft 30, in the shown example the left. In this example the lift coefficient of the left wing 32 is reduced in order to compensate a clockwise offset rolling moment of the aircraft 30.

To improve efficiency and reduce weight, the adjustment body 34 may be interrupted such that gaps are present between adjacent subsections of the adjustment body 34, preferably above flap track fairings 36.

It may be feasible to produce an adjustment body 34 as a self-adhesive strip on a roller, preferably with two or three different height-options that may be rolled off and be cut into individual pieces for arranging it on the respective wing 32. In case the material of the adjustment body 34 does not comprise a sufficient elasticity for being rolled it may be produced as rod-like objects with certain different lengths. Preferably, after production of an aircraft is finished, a test flight should be conducted. During this test flight, the offset rolling moment to be compensated may be determined. This may be accomplished by setting an aileron to a slightly deflected position in which position the offset rolling moment disappears. By knowing the resulting angle of deflection, the rolling moment may be calculated. Knowing the rolling moment, it is easily possible to calculate the necessary lateral extension of the adjustment body to be attached to the wing with a given height. For optimizing the height and the lateral extension of the adjustment body it may be possible to generate a matrix where necessary lateral extensions and different heights of the adjustment body are correlated.

Preferably the adjustment body 8 is arranged in an outermost position on the respective wing in a spanwise direction in order to exploit a largest possible lever-arm responsible for generating a compensation rolling moment. Furthermore, the lateral extension of the adjustment body may be reduced if the lever-arm can be increased and vice-versa.

Figure 5:
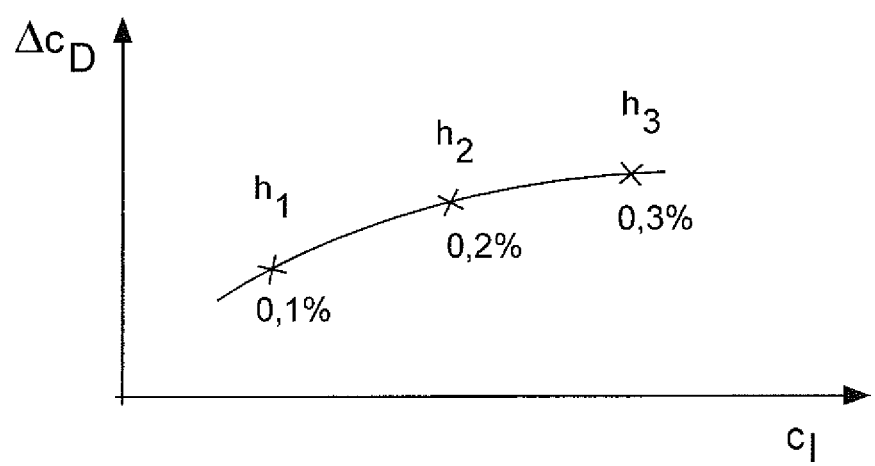
FIG. 5 shows a graph for drag increase depending on choosing an adjustment body.

FIG. 5 shows a graph in which a rolling moment coefficient $c_l$ (x-axis) and a differential drag value $\Delta c_D$ (y-axis) are correlated, wherein $\Delta c_D$ represents the drag generated through the adjustment body having a necessary height h. Increasing the height with a constant lateral extension of the adjustment body leads to an increase of $\Delta c_D$. Discrete available heights $h_1$, $h_2$ and $h_3$ may be chosen with increasing necessary rolling moment coefficient $c_l$, wherein the heights correspond to the height of the back-end surface and wherein the required rolling moment coefficient may be calculated with a known necessary compensation rolling moment by following simplified equation:

$$c_l = \frac{L_{comp}}{q \cdot S \cdot s},$$

wherein $L_{comp}$ is the required compensation rolling moment, q the dynamic pressure, preferably at cruise condition, S the aerodynamical reference surface and s the effective lever-arm. As apparent from this equation, increasing the effective lever-arm also leads to the option to decrease the necessary $c_l$, thereby reducing the impact on the lift coefficient of the aircraft. This means that the adjustment body shall be arranged at outermost positions on the respective wing, leading to a least necessary lateral extension of the adjustment body and thereby also to a least possible drag.

For example, the different heights $h_1$, $h_2$ and $h_3$ as indicated in the graph may equal 0.1%, 0.2%, 0.3% etc. of a local chord length. With only a set of a few available heights the lateral extensions of the adjustment bodies with a fixed height each have to be chosen individually. Thereby, the rolling moment coefficient $c_l$ is adjusted so as to fully compensate the offset rolling moment of the aircraft.

Figure 6:
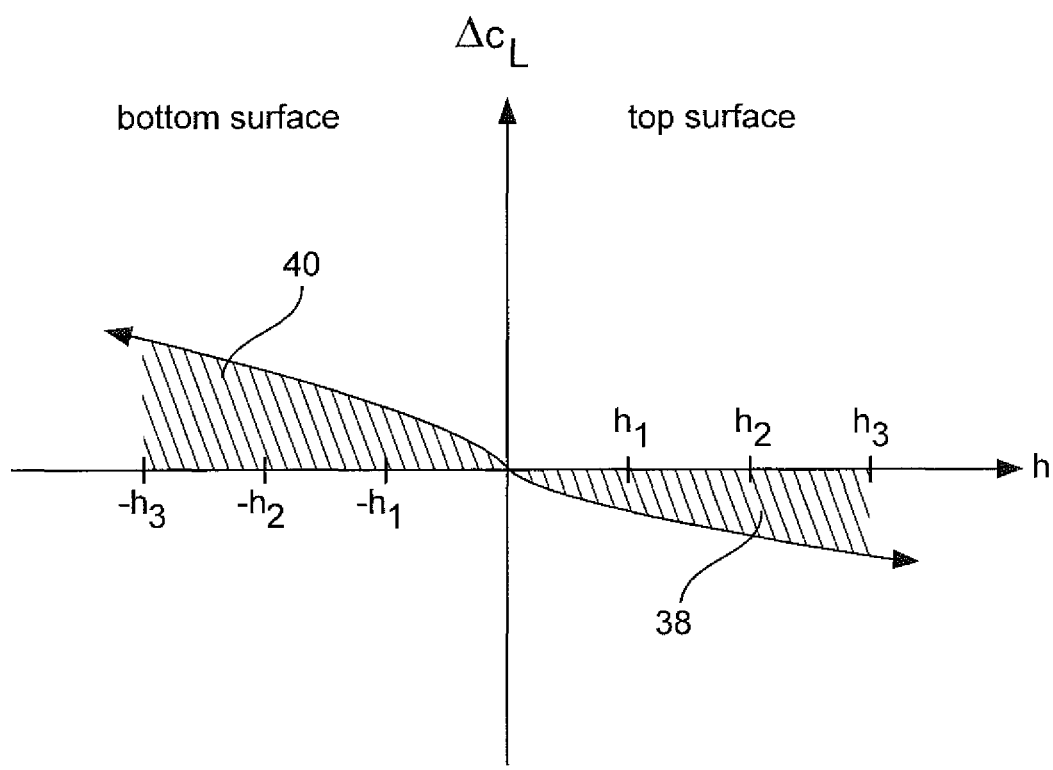
FIG. 6 shows a graph for lift change depending on the position of adjustment bodies.

Finally, FIG. 6 demonstrates the change of a local lift coefficient $c_L$. For the purpose of illustration, the heights for adjustment bodies attached to the top surface of a wing are chosen to have a positive value, as represented by $h_1$, $h_2$ and $h_3$. It is clearly apparent, that the local lift coefficient $c_L$ is decreased. The area 38 enclosed between the height-axis and the $\Delta c_L$-values for positive heights represents the reduction of structural loads of the trailing edge section. As a comparison, negative height values represent wedges attached to the bottom surface of the wing. The area 40 enclosed by the height-axis and the $\Delta c_L$-values for negative heights represent the increase of structural load for the trailing edge. It is clearly apparent that with the same height for adjustment bodies a clearly higher load is acting on the wing trailing edge section. This can be avoided by the combination according to the invention.

Finally, it is to be noted that herein the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An aircraft wing trailing edge comprising at least one flap having a first lateral extension and an adjustment body, the adjustment body comprising:
    a tapered cross section in a local chord axis direction of the wing trailing edge section with an upper adjustment body surface, a lower adjustment body surface and a back-end surface,
    wherein the lower adjustment body surface is connected to a top surface of the aircraft wing trailing edge section, and wherein the back-end surface has a height,
    wherein the adjustment body has a length in a local chord axis direction;
    wherein the adjustment body is positioned on the wing trailing edge section such that the back-end surface is flush with the wing trailing edge; and
    wherein the adjustment body has a second lateral extension equal to the first lateral extension of the at least one flap.

2. The edge section of claim 1, wherein the adjustment body has a wedge-shape.

3. The edge section of claim 1, wherein the upper adjustment body surface is planar.

4. The edge section of claim 1, wherein the upper adjustment body surface is concave.

5. The edge section of claim 1, wherein the upper adjustment body surface is convex.

6. The edge section of claim 1,
    wherein the lower adjustment body surface and the upper adjustment body surface enclose a first angle within the range of about 5° to about 25°,
    wherein said first angle is determined by the ratio of the height of the back-end surface to the length in a local chord axis direction to satisfy the range of said first angle,
    wherein said length corresponds to about 1-2% of a local chord length of the aircraft wing trailing edge section, and
    wherein said height of the back-end surface corresponds to about 0.1% to about 0.6% of the local chord length for compensating asymmetric characteristics caused by a sum of structural tolerances of an aircraft.

7. The edge section of claim 1,
    wherein the lower adjustment body surface and the upper adjustment body surface enclose a first angle at a leading edge of the adjustment body within the range of about 5° to about 25°, and
    wherein a parallel line to the lower adjustment body surface and the upper adjustment body surface enclose a second angle at the back-end surface of the adjustment body, wherein the second angle is higher than the first angle.

8. The edge section of claim 1, wherein the aircraft wing trailing edge section is part of at least one flap.

9. The aircraft wing of claim 1, wherein the wing has a maximum spanwise extension; and
    wherein the second lateral extension of the adjustment body is equal to the maximum spanwise extension.

10. An aircraft having two wings, each wing including a leading edge, a wing trailing edge, a top wing surface and a bottom wing surface,
    wherein an adjustment body is connected to the top surface of only one of the two wings, the adjustment body comprising a tapered cross section in a local chord axis direction of the wing trailing edge with an upper adjustment body surface and a lower adjustment body surface,
    wherein a back-end surface of the adjustment body has a height, and
    wherein the adjustment body is positioned on the wing such that the back-end surface of the adjustment body is flush with the wing trailing edge.

11. The aircraft of claim 10, wherein the adjustment body has a wedge-shape.

12. The aircraft of claim 10,
    wherein the lower adjustment body surface and the upper adjustment body surface enclose a first angle within the range of about 5° to about 25°,
    wherein said first angle is determined by the ratio of the height of the back-end surface to the length in a local chord axis direction to satisfy the range of said first angle,
    wherein said length of said upper adjustment body surface corresponds to about 1-2% of a local chord length of the aircraft wing trailing edge section, and
    wherein said height of the back-end surface corresponds to about 0.1% to about 0.6% of the local chord length for compensating asymmetric characteristics caused by a sum of structural tolerances of an aircraft.

13. The aircraft of claim 10,
    wherein the lower adjustment body surface and the upper adjustment body surface enclose a first angle at a leading edge of the adjustment body within the range of about 5° to about 25°, and
    wherein a parallel line to the lower adjustment body surface and the upper adjustment body surface enclose a second angle at the back-end surface of the adjustment body, wherein the second angle is higher than the first angle.

14. The aircraft of claim 10, wherein the aircraft wing comprises at least one flap and wherein the wing trailing edge is comprised of the at least one flap.

15. An aircraft wing trailing edge section comprising a wing trailing edge having a first lateral extension and an adjustment body, the adjustment body comprising:
    a tapered cross section in a local chord axis direction of the wing trailing edge section with an upper adjustment body surface, a lower adjustment body surface and a back-end surface,
    wherein the lower adjustment body surface is connected to a top surface of the aircraft wing trailing edge section, and wherein the back-end surface has a height,
    wherein the adjustment body has a length in a local chord axis direction;
    wherein the adjustment body is positioned on the wing trailing edge section such that the back-end surface is flush with the wing trailing edge; and
    wherein the adjustment body has a second lateral extension equal to the first lateral extension of the wing trailing edge.

* * * * *